United States Patent
Park

(10) Patent No.: US 11,469,490 B2
(45) Date of Patent: Oct. 11, 2022

(54) ELECTRONIC DEVICE INCLUDING ANTENNA

(71) Applicant: Samsung Electronics Co., Ltd., Suwon-si (KR)

(72) Inventor: Jungwon Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 146 days.

(21) Appl. No.: 16/636,976

(22) PCT Filed: Aug. 21, 2018

(86) PCT No.: PCT/KR2018/009566
§ 371 (c)(1),
(2) Date: Feb. 6, 2020

(87) PCT Pub. No.: WO2019/039822
PCT Pub. Date: Feb. 28, 2019

(65) Prior Publication Data
US 2020/0381807 A1    Dec. 3, 2020

(30) Foreign Application Priority Data
Aug. 21, 2017   (KR) .................. 10-2017-0105574

(51) Int. Cl.
*H01Q 1/24* (2006.01)
*H01Q 1/38* (2006.01)
(Continued)

(52) U.S. Cl.
CPC .............. *H01Q 1/243* (2013.01); *H01Q 1/38* (2013.01); *H01Q 1/42* (2013.01); *H01Q 21/0087* (2013.01)

(58) Field of Classification Search
CPC ........ H01Q 21/0087; H01Q 1/38; H01Q 1/42; H01Q 1/243; H04M 1/02
See application file for complete search history.

(56) References Cited

U.S. PATENT DOCUMENTS 9,218,020 B1 * 12/2015 Martinez ............... G06F 1/1656
2003/0162312 A1    8/2003 Takayama et al.
(Continued)

FOREIGN PATENT DOCUMENTS

JP    2014-045291 A    3/2014
KR    10-0952320 B1    4/2010
(Continued)

OTHER PUBLICATIONS

ISA/KR, International Search Report and Written Opinion of the International Searching Authority, International Application No. PCT/KR2018/009566, dated Nov. 28, 2018, 13 pages.
(Continued)

*Primary Examiner* — Graham P Smith
*Assistant Examiner* — Jae K Kim

(57) ABSTRACT

An electronic device according to various embodiments of the present invention comprises: at least one antenna; a bracket comprising a first surface having at least one antenna mounted thereon, and a second surface oriented opposite to the first surface; a cover housing covering the first surface of the bracket; a bonding member for bonding the first surface of the bracket and the cover housing; and a film disposed in an area corresponding to at least one antenna between the bonding member and the first surface of the bracket.

13 Claims, 10 Drawing Sheets

(51) Int. Cl.
*H01Q 1/42* (2006.01)
*H01Q 21/00* (2006.01)

(56) References Cited

U.S. PATENT DOCUMENTS

| | | |
|---|---|---|
| 2005/0233547 A1 | 10/2005 | Noda et al. |
| 2011/0279948 A1* | 11/2011 | Morita .................... H01Q 1/38 |
| | | 361/679.01 |
| 2012/0194998 A1* | 8/2012 | McClure ............... G06F 1/1626 |
| | | 361/679.56 |
| 2013/0341414 A1* | 12/2013 | Ziller ....................... H01Q 5/40 |
| | | 235/492 |
| 2014/0313746 A1 | 10/2014 | Song et al. |
| 2016/0037656 A1 | 2/2016 | Kim et al. |
| 2016/0218422 A1 | 7/2016 | Choi et al. |
| 2016/0253015 A1 | 9/2016 | Kim et al. |
| 2016/0344089 A1 | 11/2016 | Baik et al. |
| 2018/0310426 A1 | 10/2018 | Cho et al. |
| 2022/0057563 A1* | 2/2022 | Rim ......................... G02B 6/006 |
| 2022/0123463 A1* | 4/2022 | Chang .................... H01Q 5/307 |

FOREIGN PATENT DOCUMENTS

| | | |
|---|---|---|
| KR | 10-1017474 B1 | 2/2011 |
| KR | 10-2014-0124034 A | 10/2014 |
| KR | 10-2014-0124578 A | 10/2014 |
| KR | 10-2016-0014872 A | 2/2016 |
| KR | 10-2016-0092608 A | 8/2016 |
| KR | 10-2016-0105049 A | 9/2016 |
| KR | 10-2016-0137315 A | 11/2016 |
| KR | 10-2017-0048076 A | 5/2017 |
| KR | 10-2018-0118332 A | 10/2018 |

OTHER PUBLICATIONS

Office Action dated Sep. 7, 2021 in connection with Korean Patent Application No. 10-2017-0105574, 17 pages.

* cited by examiner

ELECTRONIC DEVICE INCLUDING ANTENNA

CROSS-REFERENCE TO RELATED APPLICATIONS

This application is a 371 National Stage of International Application No. PCT/KR2018/009566, filed Aug. 21, 2018, which claims priority to Korean Patent Application No. 10-2017-0105574, filed Aug. 21, 2017, the disclosures of which are herein incorporated by reference in their entirety.

BACKGROUND

1. Field

Various embodiments relate to an electronic device including an antenna.

2. Description of Related Art

Electronic devices have been developed to provide various functions. For example, electronic devices complexly provide various functions such as a payment service or a wireless charging function in addition to a normal communication function such as voice call or message transmission/reception. Electronic devices may have a plurality of antennas to support various functions, and for example, a plurality of antennas may be mounted on a bracket of an electronic device.

Electronic devices may include a cover housing that protects parts therein and improves the external appearance by covering the outer side of a bracket. Such as cover housing may be attached to a surface of the bracket by an adhesive member such as a double-sided tape.

SUMMARY

When a cover housing is bonded to a bracket using an adhesive member, the pattern of antennas mounted on the bracket may be damaged by the adhesive force of the adhesive member. However, when an adhesive member is disposed only in a bracket area where there is no antenna pattern, a space is formed between the bracket and the cover housing due to the difference between the height of the bracket area including the adhesive member and the bracket area not including the adhesive member, so the cover housing can be easily damaged by external shock.

Further, when a sponge is disposed in the bracket area not including the adhesive member to prevent damage due to the space between the bracket and the cover housing, a predetermined space is needed between the sponge and the adhesive member in consideration of an assembly tolerance. Accordingly, the space for disposing the adhesive member decreases, so the cover housing may not be firmly attached to the bracket.

Various embodiments are intended to provide a method of bonding a bracket and a cover housing to each other in an electronic device including an antenna.

An electronic device according to various embodiments may include: at least one antenna; a bracket having a first surface on which the at least one antenna is mounted and a second surface facing in an opposite direction to the first surface; a cover housing configured to cover the first surface of the bracket; an adhesive member configured to bond the first surface of the bracket and the cover housing; and a film disposed in an area corresponding to the at least one antenna between the adhesive member and the first surface of the bracket.

An electronic device according to various embodiments may include: at least one antenna; a bracket having a first surface on which the at least one antenna is mounted and a second surface facing in an opposite direction to the first surface; a cover housing configured to cover the first surface of the bracket; and an adhesive member having a first surface facing the bracket and a second surface facing the cover housing, and configured to bond the first surface of the bracket and the cover housing, in which the first surface of the adhesive member may include an area having a first adhesive force and an area having a second adhesive force lower than the first adhesive force, and the area having a second adhesive force of the first surface of the adhesive member may be an area corresponding to an area in which the at least one antenna is mounted.

An electronic device according to various embodiments may include: a housing that includes a front plate, a rear plate made of glass and facing the opposite direction to the front plate, and a side member surrounding a space between the front plate and the rear plate; a touch screen display positioned in the space and exposed through the front plate; an internal structure positioned between the display and the rear plate; a wireless communication circuit positioned in the housing; a conductive pattern mounted on the internal structure to be disposed between the internal structure and the rear plate, and electrically connected to the communication circuit; a double-sided adhesive film disposed between the internal structure and the rear plate and attached to the internal structure and the rear plate; and a patch film layer disposed between a portion of the double-sided adhesive film and the conductive pattern.

According to various embodiments, the electronic device can prevent damage to an antenna pattern, can reduce the gap between the bracket and the cover housing, and can prevent damage to the electronic device due to external shock.

According to various embodiments, since the adhesive member is disposed without a space for excepting the adhesive member in consideration of an assembly tolerance, it is possible to firmly attach the bracket and the cover housing.

DETAILED DESCRIPTION

Figure 1:
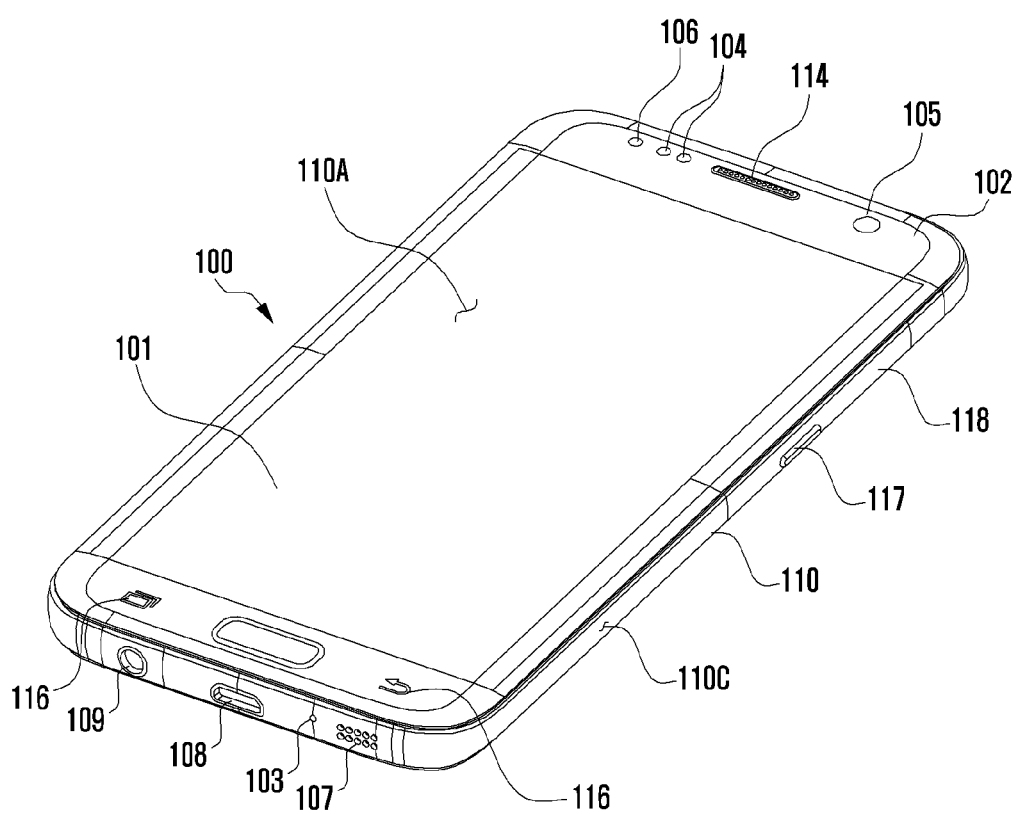
FIG. 1 is a perspective view of an electronic device according to an embodiment.

Hereinafter, various exemplary embodiments of this document will be described in detail with reference to the accompanying drawings. It should be understood that exemplary embodiments and terms used in the exemplary embodiments do not limit technology described in this document to a specific embodiment and include various changes, equivalents, and/or replacements of a corresponding exemplary embodiment. The same reference numbers are used throughout the drawings to refer to the same or like parts.

In the present disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In this document, an expression such as "A or B" and "at least one of A or/and B" may include all possible combinations of the together listed items.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

When it is described that a constituent element (e.g., a first constituent element) is "(functionally or communicatively) coupled to" or is "connected to" another constituent element (e.g., a second constituent element), it should be understood that the constituent element may be directly connected to the other constituent element or may be connected to the other constituent element through another constituent element (e.g., a third constituent element).

In this document, "configured to (or set to)" may be interchangeably used in hardware and software with, for example, "appropriate to", "having a capability to", "changed to", "made to", "capable of", or "designed to" according to a situation. In any situation, an expression "device configured to" may mean that the device is "capable of" being configured together with another device or component. For example, a phrase "processor configured to (or set to) perform A, B, and C" may mean an exclusive processor (e.g., an embedded processor) for performing a corresponding operation or a generic-purpose processor (e.g., CPU or application processor) that can perform a corresponding operation by executing at least one software program stored at a memory device.

The terms used in the present disclosure are only used to describe specific various embodiments, and are not intended to limit the present disclosure. As used herein, the singular forms are intended to include the plural forms as well, unless the context clearly indicates otherwise. Singular forms are intended to include plural forms unless the context clearly indicates otherwise. The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

An electronic device according to the present disclosure may be a device including a communication function. For example, the electronic device may include a smartphone, a tablet personal computer (tablet PC), a mobile phone, a video phone, an e-book reader, a desktop personal computer (desktop PC), a laptop personal computer (laptop PC), a netbook computer, a personal digital assistant (PDA), a portable multimedia player (PMP), a MP3 player, a mobile medical equipment, a camera, and a wearable device (e.g., at least one of a head-mounted-device (HMD) like e-glasses, an electronic clothe, an electronic bracelet, an electronic necklace, an electronic appcessory, or a smart watch).

According to various embodiments of the present disclosure, the electronic device may be a smart home appliance that has a communication function. The smart home appliance may include, for instance, at least one of a television, a digital video disk (DVD) player, an audio equipment, a refrigerator, an air conditioner, a vacuum cleaner, an oven, a microwave, a washing machine, an air purifier, a set-top box, a TV box (e.g., Samsung HomeSync™, Apple TV™, or Google TV™), a game console, an electronic dictionary, an electronic key, a camcorder, or an electronic frame.

According to various embodiments of the present disclosure, the electronic device may include at least one of various medical devices (e.g., magnetic resonance angiography (MRA), magnetic resonance imaging (MRI), computed tomography (CT), a camera, an ultrasonic equipment, etc.), a navigation device, a global positioning system receiver (GPS receiver), an event data recorder (EDR), a flight data recorder (FDR), a vehicle infotainment device, a marine electronic equipment (e.g., a marine navigation system and a gyro compass, etc.), an avionics, or a security device.

According to various embodiments of the present disclosure, the electronic device may include at least one of part of furniture or building/structure including a communication function, an electronic board, an electronic signature receiving device, a projector, or various measurement devices (e.g., water, electricity, gas, or a radio wave, etc.). The electronic device according to the present disclosure may be a combination of one or more of the aforementioned various devices. According to various embodiments of the present disclosure, the electronic device may include a flexible device. Further, it is apparent to those skilled in the art that the electronic device according to the present disclosure is not limited to the above-described devices.

Hereinafter, an electronic device according to various embodiments will be described with reference to the accompanying drawings. In the disclosure, the term "user" may indicate a person using an electronic device or a device (e.g., an artificial intelligence electronic device) using an electronic device.

Each of the above-described component elements of hardware according to the disclosure may include one or more elements, and the names of the corresponding elements may change based on the type of electronic device. According to various embodiments, the electronic device 100 may include at least one of the elements described in the present document. Some elements may be omitted or other additional elements may be further included in the electronic device. Also, some of the elements of the electronic device 100 according to various embodiments may be combined into one entity, which may perform functions identical to those of the corresponding elements before the combination.

Figure 2:
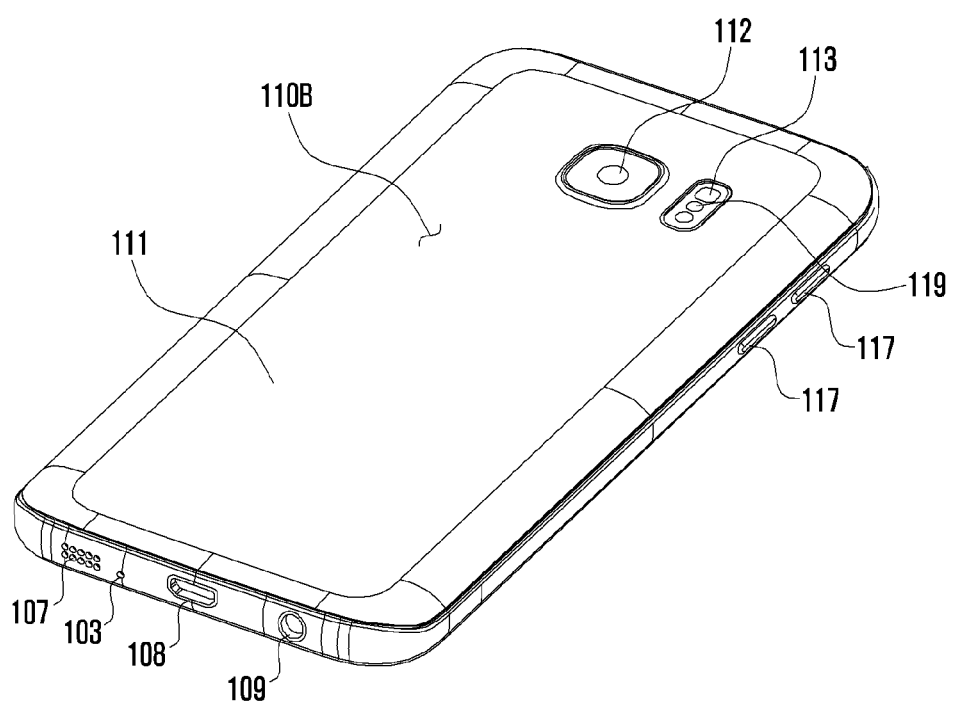
FIG. 2 is a perspective view showing the rear surface of the electronic device of FIG. 1 according to an embodiment.

Referring to FIG. 1 and FIG. 2, an electronic device 100 according to an embodiment may include a housing 110 including a first surface (or front surface) 110A, a second surface (or rear surface) 110B, and a side surface 110C surrounding the space between the first surface 110A and the second surface 110B.

In another embodiment (not illustrated), the housing may denote a structure that forms a part of the first surface 110A, the second surface 110B, and the side surface 110C illustrated in FIG. 1. According to an embodiment, the first surface 110A may be formed by a front plate 102, at least a part of which is substantially transparent (for example, a glass plate including various coating layers, or a polymer plate). The second surface 110B may be formed by a rear plate 111 that is substantially opaque. The rear plate 111 may be made of coated or colored glass, ceramic, polymer, metal (for example, aluminum, stainless steel (STS), or magnesium), or a combination of at least two of the above-mentioned materials The side surface 110C may be formed by a side bezel structure (or "side member") 118 which is coupled to the front plate 102 and to the rear plate 111, and which includes metal and/or polymer. In some embodiments, the rear plate 111 and the side bezel structure 118 may be formed integrally and may include the same material (for example, a metal material such as aluminum).

According to an embodiment, the electronic device 100 may include at least one of a display 101, audio modules 103, 107, and 114, sensor modules 104, 116, and 119, camera modules 105, 112, and 113, a key input devices 115, 116 and 117, a light-emitting element 106, and connector holes 108 and 109. In some embodiments, at least one of the constituent elements (for example, the key input devices 115, 116 and 117 or the light-emitting element 106) of the electronic device 100 may be omitted, or the electronic device 100 may additionally include another constituent element.

The display 101 may be exposed through a corresponding part of the front plate 102, for example. The display 101 may be coupled to or arranged adjacent to a touch sensing circuit, a pressure sensor capable of measuring the intensity (pressure) of a touch, and/or a digitizer that detects a magnetic field-type stylus pen.

The audio modules 103, 107, and 114 may include a microphone hole 103 and speaker holes 107 and 114. A microphone for acquiring an external sound may be arranged in the microphone hole 103, and a plurality of microphones may be arranged therein such that the direction of a sound can be sensed in some embodiments. The speaker holes 107 and 114 may include an outer speaker hole 107 and a speech receiver hole 114. In some embodiments, the speaker holes 107 and 114 and the microphone hole 103 may be implemented as a single hole, or a speaker may be included (for example, a piezoelectric speaker) without the speaker holes 107 and 114.

The sensor modules 104, 116, and 119 may generate an electric signal or a data value corresponding to the internal operating condition of the electronic device 100 or the external environment condition thereof. The sensor modules 104, 116, and 119 may include, for example, a first sensor module 104 (for example, a proximity sensor) arranged on the first surface 110A of the housing 110, and/or a second sensor module (not illustrated) (for example, a fingerprint sensor), and/or a third sensor module 119 (for example, an HRM sensor) arranged on the second surface 110B of the housing 110. The fingerprint sensor may be arranged not only on the first surface 110A (for example, the display 101) of the housing 110, but also on the second surface 110B thereof. The electronic device 100 may further include a sensor module not illustrated, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or a luminance sensor 104.

The camera modules 105, 112, and 113 may include a first camera device 105 arranged on the first surface 110A of the electronic device 100, a second camera device 112 arranged on the second surface 110B thereof, and/or a flash 113. The camera devices 105 and 112 may include a single lens or a plurality of lenses, an image sensor, and/or an image signal processor. The flash 113 may include, for example, a light-emitting diode or a xenon lamp. In some embodiments, two or more lenses (an infrared camera, a wide-angle lens, and a telephoto lens) and image sensors may be arranged on a single surface of the electronic device 100.

The key input devices 115, 116 and 117 may include a home key button 115 arranged on the first surface 110A of the housing 110, a touch pad 116 arranged on adjacent the home key button 115 and/or a side key button 117 arranged on the side surface 110C of the housing 110. In another embodiment, the electronic device 100 may not include a part of the above-mentioned key input devices 115, 116 and 117 or the entire key input devices 115, 116 and 117, and the key input device 117 (not included) may be implemented in another type, such as a soft key, on the display 101.

The light-emitting element 106 may be arranged on the first surface 110A of the housing 110, for example. The light-emitting element 106 may provide information regarding the condition of the electronic device 100 in a light type, for example and may include an LED.

The connector holes 108 and 109 may include a first connector hole 108 capable of containing a connector (for example, a USB connector) for transmitting/receiving power and/or data to/from an external electronic device, and/or a second connector hole (for example, an earphone jack) 109 capable of containing a connector for transmitting/receiving an audio signal to/from the external electronic device.

Figure 3:
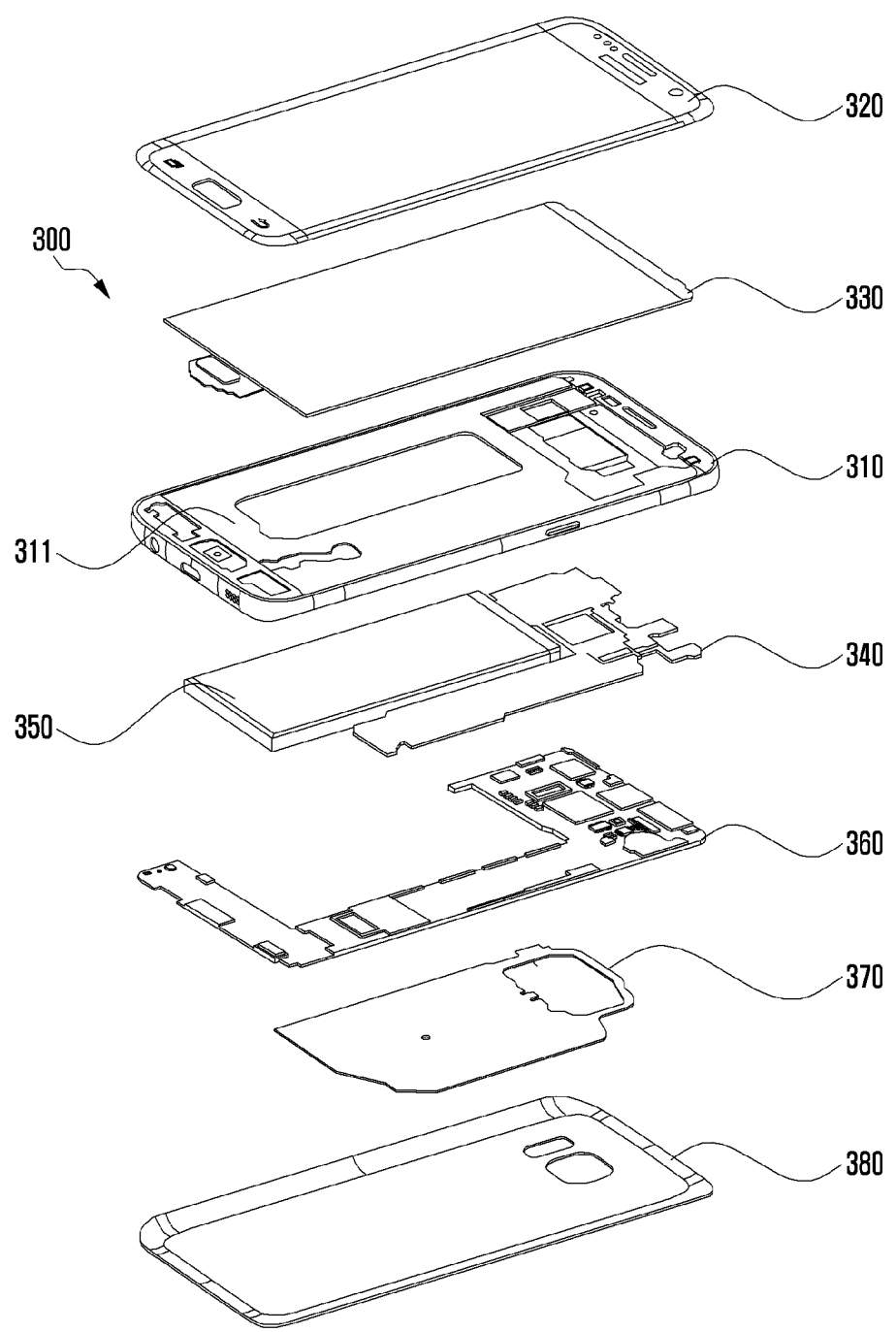
FIG. 3 is an exploded perspective view of the electronic device of FIG. 1 according to an embodiment.

Referring to FIG. 3, the electronic device 300 may include a side bezel structure 310, a first support member 311 (for example, a bracket), a front plate 320, a display 330, a printed circuit board 340, a battery 350, a second support member 360 (for example, a rear case), an antenna 370, and a rear plate 380. In some embodiments, at least one of the constituent elements (for example, the first support member 311 or the second support member 360) of the electronic device 300 may be omitted, or the electronic device 300 may further include another constituent element. At least one of the constituent elements of the electronic device 300 may be identical or similar to at least one of the constituent elements of the electronic device 100 of FIG. 1 or FIG. 2, and repeated descriptions thereof will be omitted herein.

The first support member 311 may be arranged inside the electronic device 300 and connected to the side bezel structure 310, or may be formed integrally with the side bezel structure 310. The first support member 311 may be made of a metal material and/or a nonmetal (for example, polymer) material, for example. The display 330 may be coupled to one surface of the first support member 311, and the printed circuit board 340 may be coupled to the other surface thereof. A processor, a memory, and/or an interface may be mounted on the printed circuit board 340. The processor may include, for example, one or more of a central processing device, an application processor, a graphic processing device, an image signal processor, an sensor hub processor, or a communication processor.

The memory may include a volatile memory or a non-volatile memory, for example.

The interface may include, for example, a high definition multimedia interface (HDMI), a universal serial bus (USB) interface, an SD card interface, and/or an audio interface. The interface may connect the electronic device 300 with an external electronic device electrically or physically, for example, and may include a USB connector, an SD card/MMC connector, or an audio connector.

The battery 350 is an device for supplying power to at least one constituent element of the electronic device 300, and may include a non-rechargeable primary cell, a rechargeable secondary cell, or a fuel cell, for example. At least a part of the battery 350 may be arranged on substantially the same plane with the printed circuit board 340, for example. The battery 350 may be arranged integrally inside the electronic device 300, or may be arranged such that the same can be attached to/detached from the electronic device 300.

The antenna 370 may be arranged between the rear plate 380 and the battery 350. The antenna 370 may include, for example, a near field communication (NFC) antenna, a wireless charging antenna, and/or a magnetic secure transmission (MST) antenna. The antenna 370 may conduct near-field communication with an external device or may wirelessly transmit/receive power necessary for charging, for example. In another embodiment, an antenna structure may be formed by a part or a combination of the side bezel structure 310 and/or the first support member 311.

Figure 4:
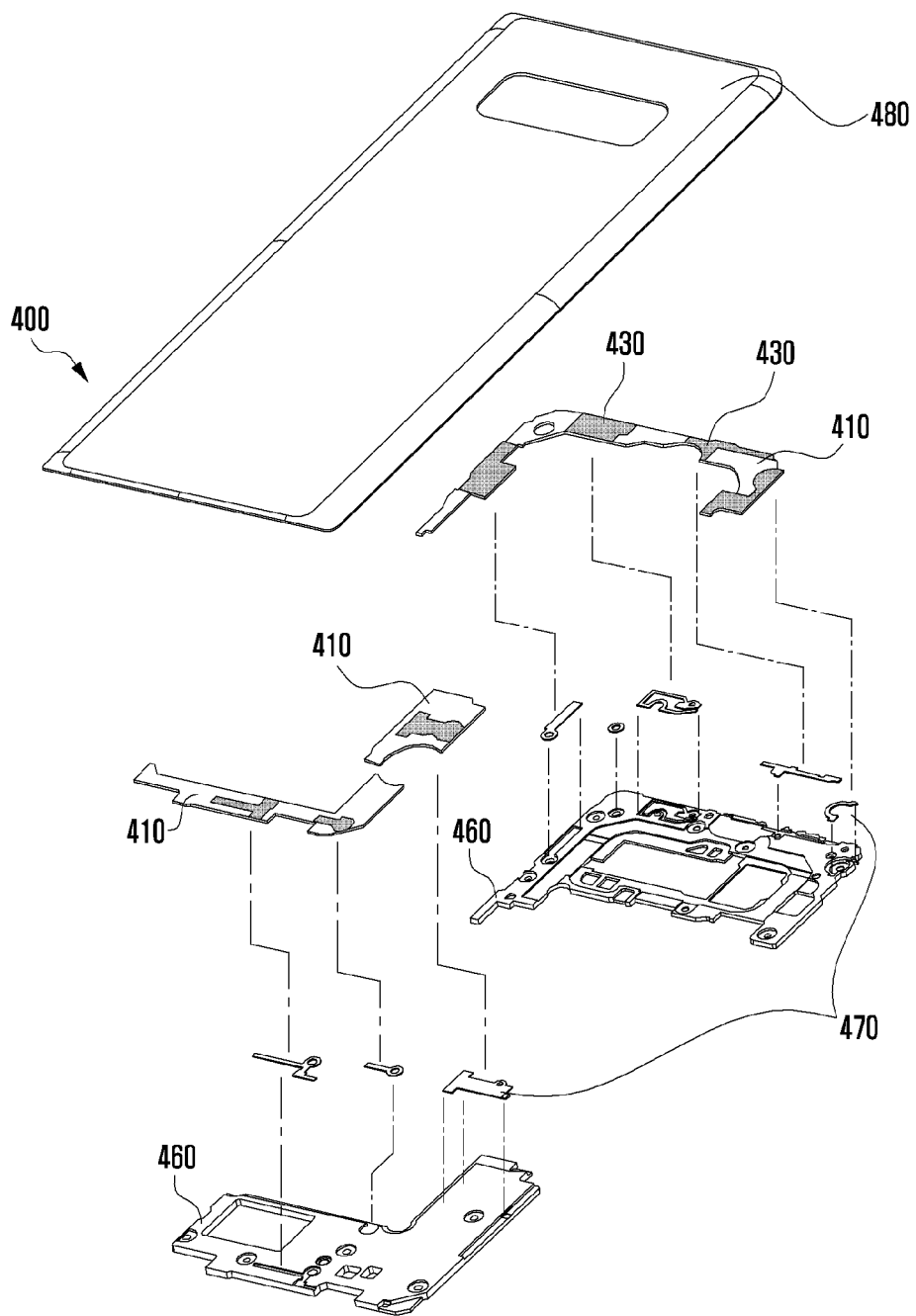
FIG. 4 is an exploded perspective view for illustrating the position of an adhesive member of an electronic device according to various embodiments.

FIG. 4 is an exploded perspective view for illustrating the position of an adhesive member 410 in the electronic device 400 according to various embodiments.

Referring to FIG. 4, the electronic device 400 may include: a bracket 460 (e.g., a rear case 460); at least one antenna 470 (e.g., antenna 370); a cover housing 480 (e.g., a housing 110 and a rear plate 111); and an adhesive member 410 that bonds the bracket 460 and the cover housing 480.

According to various embodiments, the at least one antenna 470 may be mounted on at least a surface of the bracket 460. For example, the antennas 470 may be mounted on a surface of the bracket 460 and spaced a predetermined distance or more apart from each other so that their performance is not deteriorated. Though not shown, the at least one antennas 470 may extend from a surface to the other surface of the bracket 460 along a hole.

According to various embodiments, the cover housing 480 can cover at least a surface of the bracket 460. For example, the cover housing 480 may correspond to the front surface or the rear surface of the electronic device 400. For example, the cover housing 480 may occupy the entire rear surface or portions of the rear surface and sides of the electronic device 400. The cover housing 480 may be flat or may be curved with the upper end, the lower end, the left end and/or the right end partially bent.

For example, the cover housing 480 can protect the configuration inside the electronic device 400. For example, the cover housing 480 may be made of a ceramic material. As another example, the cover housing 480 may be made of a material such as reinforced glass, plastic, or an aluminum oxide. For example, the cover housing 480 may be made of a substantially opaque material such as coated or colored glass, ceramic, a polymer, metal (e.g., aluminum, stainless steel (STS), or magnesium), or a combination at least two thereof.

According to various embodiments, the adhesive member 410 may be positioned between the bracket 460 and the cover housing 480.

For example, the adhesive member 410 can bond the surface of the bracket 460 on which the at least one antenna 470 is mounted and the cover housing 480.

The adhesive member 410 may have a first surface facing the bracket 460 and a second surface facing the cover housing 480 in the opposite direction to the first surface.

According to various embodiments, the adhesive member 410 may have a non-adhesive area in at least a portion of the first surface of the adhesive member 410. For example, the non-adhesive area may have an adhesive force that is different from the adhesive force of the adhesive member 410.

The adhesive member 410 may include a film 430 (e.g., patch film layer) in the non-adhesive area. For example, the film 430 may have an adhesive force lower than that of the adhesive member 410. For example, the adhesive force of the film 430 may be about 50 g/in or lower.

Although the film 430 shown in FIG. 4 is disposed in the second surface of the adhesive member 410, this is only for explaining that the non-adhesive area including the film 430 corresponds to the area in which the antenna 470 is mounted to help understanding, so the film 430 may be included in the first surface in the direction in which the adhesive member 410 faces the bracket 460, and may not be included in the second surface.

For example, the non-adhesive area of the first surface of the adhesive member 410 may be an area corresponding to the at least one antenna 470 mounted on the bracket 460.

For example, in order to prevent the pattern of the antenna 470 from being damaged by the adhesive force of the adhesive member 410, the non-adhesive area may include an area in which the pattern of the antenna 470 is formed and an area spaced about 0.3 to 1 mm apart from the pattern.

As another example, it may be possible to form an area having an adhesive force lower than those of other areas of the adhesive member 410 by reducing the adhesive force of the non-adhesive area of the adhesive member 410 by radiating a laser or applying specific liquid to the non-adhesive area, without the film 430 included in the non-adhesive area of the first surface of the adhesive member 410.

Figure 5A:
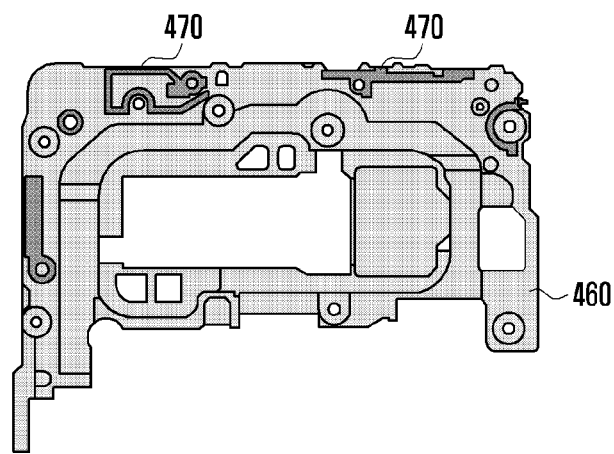
FIGS. 5A and 5B are views showing antennas and a bracket on which the antennas are mounted, according to various embodiments.
Figure 5A:
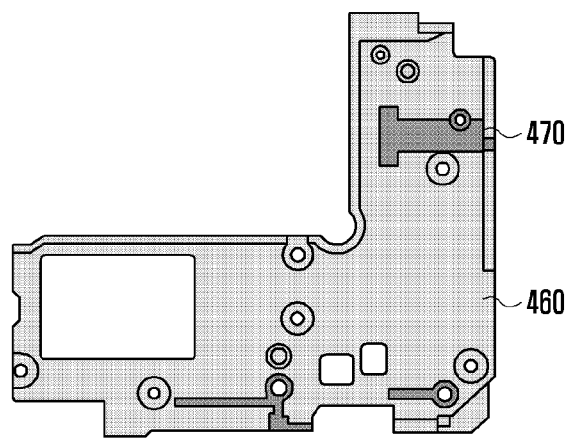
Figure 5B:
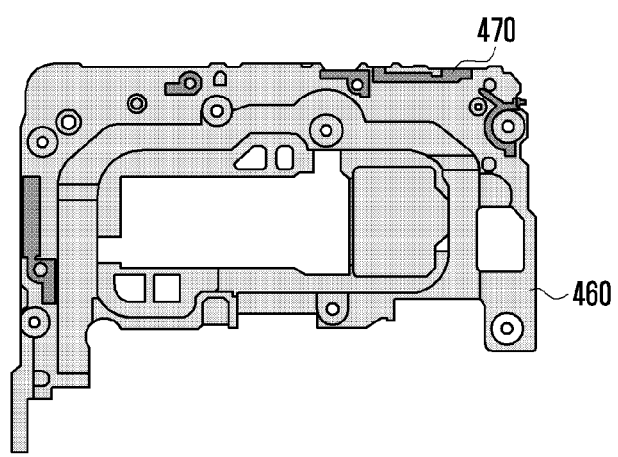
Figure 5B:
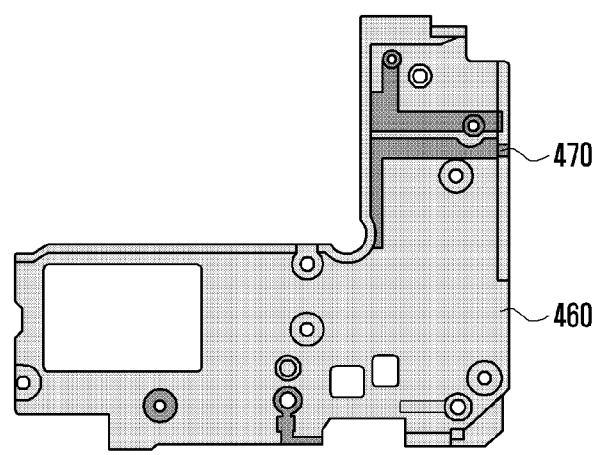

FIGS. 5A and 5B are views showing the antennas 470 and the bracket 460 on which the antenna 470 is mounted, according to various embodiments.

Referring to FIGS. 5A and 5B, at least one antenna 470 may be mounted on at least one surface of the bracket 460 according to various embodiments.

For example, the antennas 470 may be spaced a predetermined distance or more from each other so that they do not deteriorate their performance each other.

For example, the antenna 470 may include a laser direct structuring (LDS) antenna. For example, the LDS antenna may be manufactured by forming the shape of an antenna pattern on the bracket 460 using a laser and then forming the antenna pattern by applying a conductive material to the formed shape.

As shown in FIGS. 5A and 5B, the antennas 470 mounted on the bracket 460 may be disposed in various shapes at various positions on the bracket 460 in accordance with their purposes and uses, and are not limited to the shapes and positions described herein.

Figure 6:
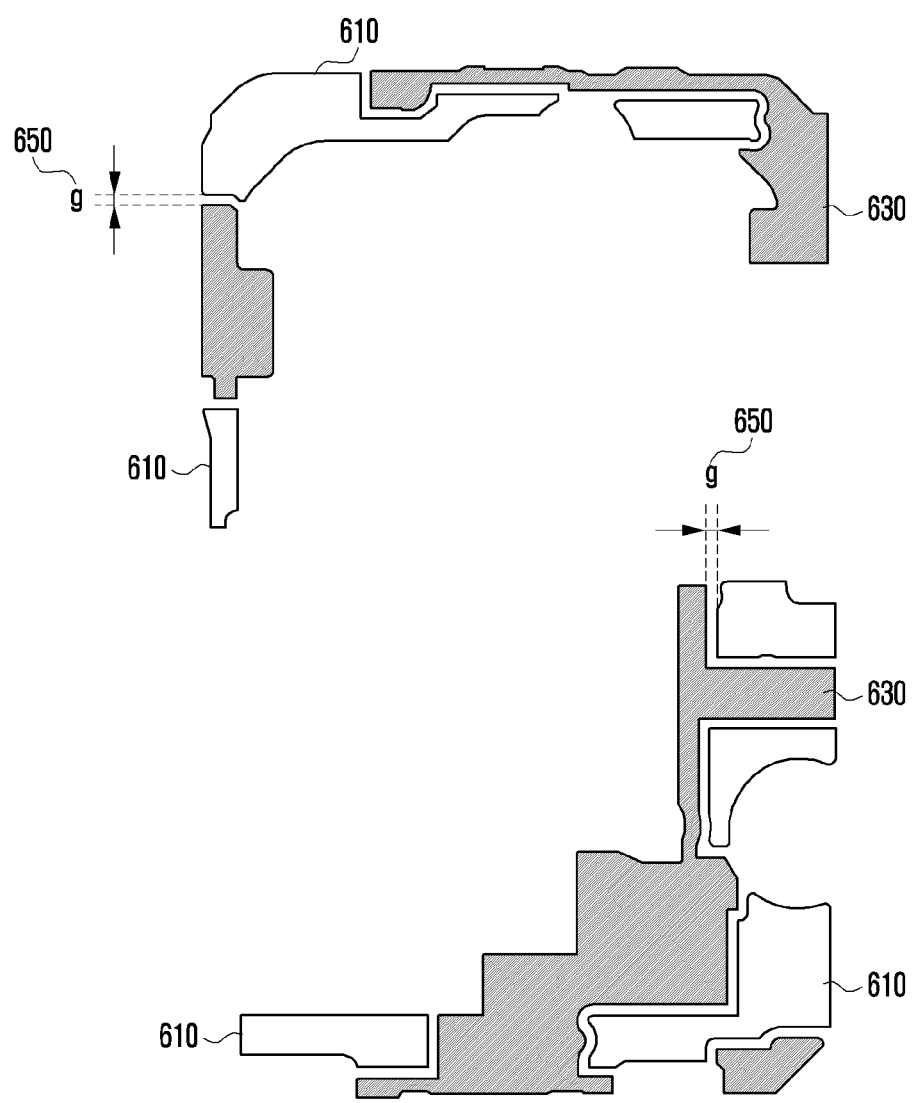
FIG. 6 is a view showing an adhesive member according to various embodiments.
Figure 7:
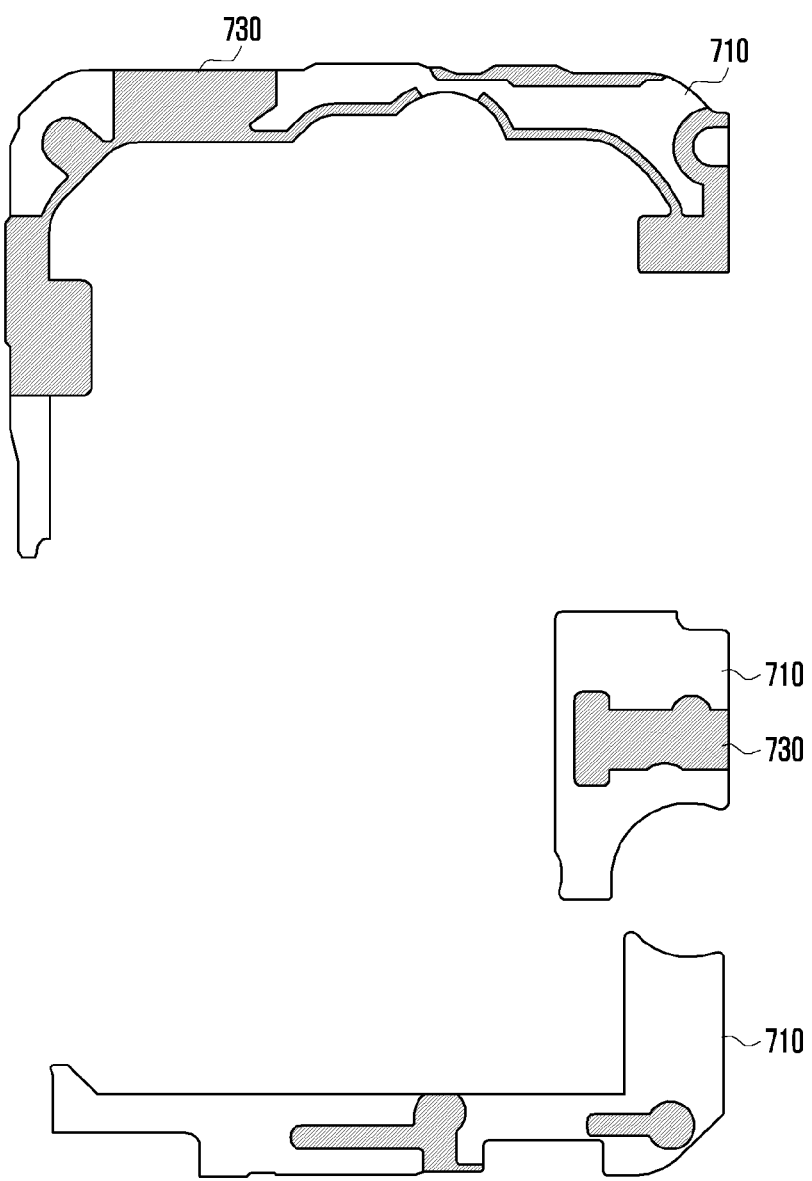
FIG. 7 is another view showing an adhesive member according to various embodiments.

FIG. 6 is a view showing an adhesive member 610 according to various embodiments. FIG. 7 is another view showing an adhesive member 710 according to various embodiments.

Referring to FIGS. 6 and 7, the adhesive member 610, 710 (e.g., the adhesive member 410) according to various embodiments may be attached to the area in which the antenna 470 is mounted and the area in which the antenna 470 is not mounted on the bracket 460. For example, the adhesive member 610, 710 may be attached to most area except for a hole area on the bracket 460.

For example, the adhesive member 610, 710 may include a double-sided adhesive film. For example, the adhesive member 610, 710 may include an optically transparent optical clear adhesive (OCA), an optical clear resin (OCR), or at least one of the OCA and the OCR.

According to various embodiments, the adhesive member 610, 710 may further include a film 630, 730 (e.g., the film 430), which has an adhesive force different from that of the adhesive member 610, 710, in at least a portion of a surface facing the bracket 460. For example, the film 630, 730 may have an adhesive force lower than that of the adhesive member 610, 710. For example, the adhesive force of the film 630, 730 may be about 50 g/in or lower.

For example, the film 630, 730 may be disposed in an area that corresponds to the area that comes in contact with the antenna 470 mounted on the bracket 460 when the adhesive member 610, 710 is bonded to the bracket 460.

For example, the area in which the film 630, 730 is disposed may include the pattern of the antenna 470 and an area spaced about 0.3 to 1 mm apart from the patterns.

The adhesive member 610, 710 according to various embodiments includes the adhesive member 610, 710 not only in the area not corresponding to the antenna 470, but in the area corresponding to the antenna 470, but includes the film 630, 730 in the area corresponding to the antenna 470, thereby being able to prevent damage to the antenna 470.

For example, the adhesive member 610, 710 according to an embodiment may be disposed only in some areas that are not in contact with the antennas 470 mounted on the bracket 460.

When the adhesive member 610, 710 is in direct contact with the antenna 470 mounted on the bracket 460, the pattern of the antenna may be damaged by the adhesive force of the adhesive member 610, 710. For example, a portion of the conductive pattern of the antenna 470 is torn apart by the adhesive force of the adhesive member 610, 710, so the performance of the antenna 470 may be deteriorated. Accordingly, the adhesive member 610, 710 may be formed only in a portion of the area in which the antenna 470 is not mounted on the bracket 460.

For example, the adhesive member 610, 710 may include a double-sided adhesive film having a thickness of about 0.2 mm.

For example, when the electronic device 400 includes the adhesive member 610, 710 only in a portion that is not in contact with the antenna patterns of the bracket 460, the bracket area to which the adhesive member 610, 710 is attached is attached to the cover housing 480 without a specific gap (as shown in FIG. 7), but a gap 650 from the bracket area in which the adhesive member 610 is not attached may be formed by the thickness of the adhesive member 610 (as shown in FIG. 6). When there is a gap between the bracket 460 and the cover housing 480, the cover housing 480 may be easily damaged by external shock.

According to an embodiment, the electronic device 400 may include a support member (e.g., a sponge) in the gap 650 between the bracket 460 without the adhesive member 610 and the cover housing 480 to fill the gap. For example, the support member may be disposed in the area in which the antenna is not mounted.

When the electronic device 400 includes a support member, the adhesive member 610 may have to be disposed with a gap g over a predetermined distance from the area in which the support member is disposed in consideration of the assembly tolerance from the support member when the electronic device 400 is manufactured. For example, the support member and the adhesive member 610 may have to be disposed with a gap over about 1 mm in consideration of the assembly tolerance and a jig difference.

As shown in FIG. 7, since the adhesive member 710 according to various embodiments can be attached to both of the area in which the antenna 470 is mounted and the area in which the antenna 470 is not mounted, there is no requirement for a space 650 considering the assembly tolerance in the area not including the adhesive member 710, so it is possible to dispose the adhesive member 710 in a relative wide area and bond the bracket 460 and the cover housing 480. Further, since the adhesive member 710 includes the film 730 in the area corresponding to the pattern of the antenna 470, it is possible to prevent damage to the antenna. The thickness of the adhesive member 710 may be in the range of about 0.2 to 1 mm and the thickness of the film 730 included in the area corresponding to the pattern of the antenna 470 may be about 0.01 to 1 mm (e.g., about 0.1 mm or less).

According to various embodiments, the adhesive member 610, 710 including the film 630, 730 on at least a portion may be manufactured by a process of forming holes and cut lines for assembling, a process of forming the shape of the film 630, 730, a process of forming the shape of the adhesive member 610, 710, and a process of forming the shape of the bracket 460.

Figure 8A:
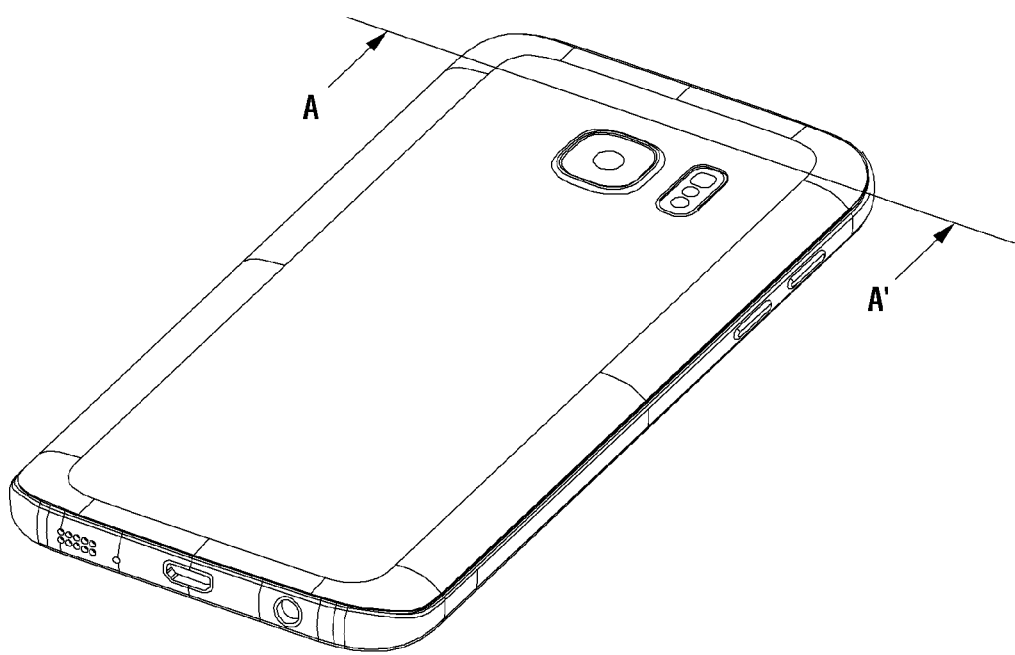
FIG. 8A is the perspective view showing the rear surface of the electronic device of FIG. 2 according to an embodiment, with section line A-A'.
Figure 8B:
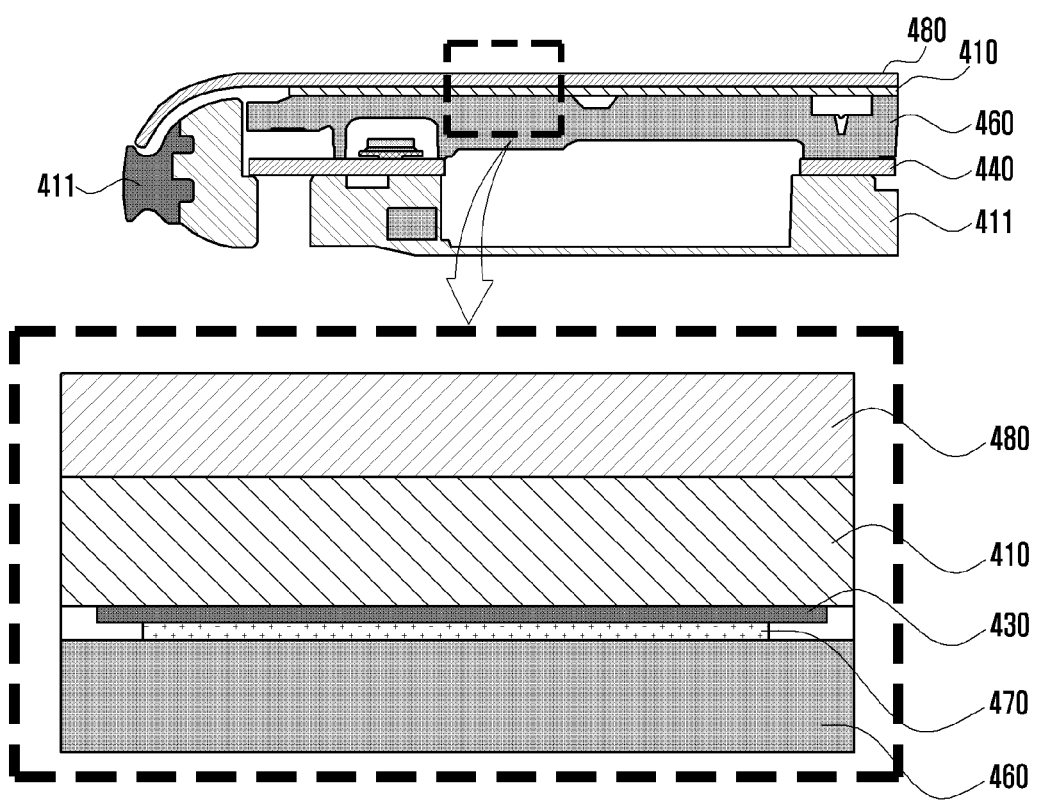
FIG. 8B is a cross-sectional view taken along line A-A' illustrated in FIG. 8A, together with an enlargement thereof.

FIG. 8A is the rear perspective view of the electronic device of FIG. 2, and FIG. 8B is a cross-sectional view of the electronic device of taken along line A-A', together with an enlargement of a portion thereof.

According to various embodiments, a bracket 460 and a cover housing 480 can be bonded by an adhesive member 410.

At least one antenna 470 may be mounted in at least an area of the bracket 460.

For example, the adhesive member 410 may further include a film 430 in at least an area of a first surface facing the bracket 460. For example, the area in which the film 430 is disposed may be an area corresponding to the at least one antenna 470 mounted on the bracket 460. For example, the area in which the film 430 is disposed and the corresponds to the at least one antenna 470 may include an area in which the pattern of the antenna 470 is formed and an area spaced about 0.3 to 1 mm apart from the area.

For example, in the area in which the pattern of the antenna 470 is formed in the electronic device 400, the conductive pattern of the antenna 470 may be mounted on a surface of the bracket 460, the film 430 may be included in the opposite direction to the surface on which the conductive pattern of the antenna 470 faces the bracket 460, and the adhesive member 410 (e.g., a double-sided adhesive film) may be attached in the opposite direction to the surface facing the antenna 470. Further, the cover housing 480 (e.g., a cover housing made of a ceramic material) may be attached in the opposite direction to the surface of the adhesive member 410 facing the film 430.

For example, the cross-section of the area in which the pattern of the antenna 470 is formed may have a structure in which the cover housing 480, the adhesive member 410, the film 430, the antenna 470, and the bracket 460 are sequentially stacked.

For example, the film 430 may include a polyethylene terephthalate (PET) film. The film 430 may have an adhesive force different from that of the adhesive member 410, and for example, the adhesive force of the film 430 may be about 50 g/in or less.

For example, the adhesive member 410 may have a thickness in the range of about 0.2 to 1 mm. For example, the thickness of the film 430 may be about 0.01 to 1 mm (e.g., about 0.1 mm or less) and the thickness of the antenna 470 may be about 0.01 to 1 mm (e.g., about 0.1 mm or less).

According to an embodiment, the thickness of the adhesive member 410 may be about 0.23 mm and the thickness of each of the film 430 and the antenna 470 may be about 0.01 mm. For example, since the thickness of the adhesive member 410 is relatively larger than that of the film 430, the gap by the area not including the film influences the rigidity of the cover housing 480 less than the influence by the gap formed by the area not including the adhesive member 410.

According to various embodiments, the adhesive member 410 may be included in both of the area in which the antenna 470 is mounted and the area in which the antenna 470 is not mounted on the bracket 460. For example, the adhesive member 410 is included even in the area in which the antenna 470 is mounted on the bracket 460, so there is no need for a separate support member (e.g., a sponge) for the gap, thereby being remove the space (e.g., a gap of about 1 mm) for the assembly tolerance between the support member and the adhesive member 410.

An electronic device according to various embodiments may include: a housing that includes a front plate, a rear plate made of glass and facing the opposite direction to the front plate, and a side member surrounding a space between the front plate and the rear plate; a touch screen display positioned in the space and exposed through the front plate; an internal structure positioned between the display and the rear plate; a wireless communication circuit positioned in the housing; a conductive pattern mounted on the internal structure to be disposed between the internal structure and the rear plate, and electrically connected to the communication circuit; a double-sided adhesive film disposed between the internal structure and the rear plate and attached to the internal structure and the rear plate; and a patch film layer disposed between a portion of the double-sided adhesive film and the conductive pattern.

According to an embodiment, the patch film layer may be made of polyethylene terephthalate (PET).

For example, the patch film layer may have a thickness in the range of about 0.01 to 1 mm. For example, the patch film layer may have an adhesive force lower than that of the double-sided adhesive film.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to the disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the disclosure may be implemented by a command stored in a computer-readable storage medium in a programming module form. When the command is executed by one or more processors, the one or more processors may perform a function corresponding to the command.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the disclosure, and vice versa.

The programming module according to the disclosure may include one or more of the aforementioned components or may further include other additional components, or some of the aforementioned components may be omitted. Operations executed by a module, a programming module, or other component elements according to various embodiments of the disclosure may be executed sequentially, in parallel, repeatedly, or in a heuristic manner. Furthermore, some operations may be executed in a different order or may be omitted, or other operations may be added.

The embodiments disclosed herein are provided merely to easily describe technical details of the disclosure and to help the understanding of the disclosure, and are not intended to limit the scope of the disclosure. Therefore, it should be construed that all modifications and changes or modified and changed forms based on the technical idea of the disclosure fall within the scope of the disclosure.

The invention claimed is:

1. An electronic device comprising:
   at least one antenna;
   a bracket having a first surface on which the at least one antenna is mounted and a second surface facing in an opposite direction to the first surface;
   a cover housing configured to cover the first surface of the bracket;
   an adhesive member configured to bond the first surface of the bracket and the cover housing; and
   a film disposed in an area corresponding to the at least one antenna between the adhesive member and the first surface of the bracket.

2. The electronic device of claim 1, wherein the film has an adhesive force lower than an adhesive force of the adhesive member.

3. The electronic device of claim 1, wherein the film has a thickness of 0.01 to 1 mm.

4. The electronic device of claim 1, wherein an area in which the film is disposed and that corresponds to the at least one antenna includes an area spaced 0.3 to 1 mm from a pattern of the at least one antenna.

5. The electronic device of claim 1, wherein the adhesive member has a thickness of 0.02 to 1 mm.

6. The electronic device of claim 1, wherein the at least one antenna has a thickness of 0.01 to 1 mm.

7. The electronic device of claim 1, wherein the at least one antenna includes a laser direct structuring (LDS) antenna.

8. The electronic device of claim 1, wherein the cover housing is made of a ceramic material.

9. The electronic device of claim 1, wherein the adhesive member includes an optically transparent optical clear adhesive (OCA), an optical clear resin (OCR), or at least one of the OCA and the OCR.

10. The electronic device of claim 1, wherein the film includes a polyethylene terephthalate (PET) film.

11. An electronic device comprising:
    at least one antenna;
    a bracket having a first surface on which the at least one antenna is mounted and a second surface facing in an opposite direction to the first surface;
    a cover housing configured to cover the first surface of the bracket; and
    an adhesive member having a first surface facing the bracket and a second surface facing the cover housing, and configured to bond the first surface of the bracket and the cover housing,
    wherein the first surface of the adhesive member includes an area having a first adhesive force and an area having a second adhesive force lower than the first adhesive force, and
    wherein the area having a second adhesive force of the first surface of the adhesive member is an area corresponding to an area in which the at least one antenna is mounted.

12. The electronic device of claim 11, wherein the second surface of the adhesive member has the first adhesive force, and
    wherein the area having the second adhesive force of the first surface of the adhesive member includes an area spaced 0.3 to 1 mm apart from a pattern of the at least one antenna.

13. The electronic device of claim 11, wherein the at least one antenna includes a laser direct structuring (LDS) antenna,
    wherein the cover housing is made of a ceramic material, and
    wherein the adhesive member includes an optically transparent optical clear adhesive (OCA), an optical clear resin (OCR), or at least one of the OCA and the OCR.

* * * * *